United States Patent
Konda et al.

(10) Patent No.: US 11,245,721 B2
(45) Date of Patent: Feb. 8, 2022

(54) USING A BLOCKCHAIN FOR DISTRIBUTED DENIAL OF SERVICE ATTACK MITIGATION

(71) Applicant: McAfee, LLC, San Jose, CA (US)

(72) Inventors: Tirumaleswar Reddy Konda, Bangalore (IN); Harsha Ramamurthy Joshi, Bangalore (IN); Piyush Pramod Joshi, Aurangabad (IN); Eric Donald Wuehler, Beaverton, OR (US)

(73) Assignee: McAfee, LLC, San Jose, CA (US)

( * ) Notice: Subject to any disclaimer, the term of this patent is extended or adjusted under 35 U.S.C. 154(b) by 218 days.

(21) Appl. No.: 16/225,646

(22) Filed: Dec. 19, 2018

(65) Prior Publication Data
US 2020/0204580 A1    Jun. 25, 2020

(51) Int. Cl.
H04L 29/06    (2006.01)

(52) U.S. Cl.
CPC .......... *H04L 63/1458* (2013.01); *H04L 63/20* (2013.01); *H04L 63/308* (2013.01); *H04L 2463/141* (2013.01)

(58) Field of Classification Search
CPC ... H04L 63/1458; H04L 63/20; H04L 63/308; H04L 9/3239; H04L 9/3247
See application file for complete search history.

(56) References Cited

U.S. PATENT DOCUMENTS

| | | | |
|---|---|---|---|
| 9,350,758 B1 | 5/2016 | Aharoni et al. | |
| 2017/0366577 A1* | 12/2017 | Shapira | H04L 63/0236 |
| 2018/0287780 A1* | 10/2018 | Safford | H04L 67/42 |
| 2018/0307859 A1 | 10/2018 | Lafever et al. | |
| 2019/0007437 A1* | 1/2019 | Smelker | H04L 63/1425 |

(Continued)

FOREIGN PATENT DOCUMENTS

| | | |
|---|---|---|
| GN | 113169981 A | 7/2021 |
| WO | 2017164980 A1 | 9/2017 |
| WO | 2018222222 A1 | 12/2018 |

OTHER PUBLICATIONS

Sagirlar, Gokhan; Carminati, Barbara; Ferrari, Elena; "AutoBotCatcher: Blockchain-based P2P Botnet Detection for the Internet of Things", 4th International Conference on Collaboration and Internet Computing (CIC), IEEE, Oct. 18-20, 2018, pp. 1-8.*

(Continued)

*Primary Examiner* — Victor Lesniewski
(74) *Attorney, Agent, or Firm* — Patent Capital Group (57) ABSTRACT

Particular embodiments described herein provide for a system that can be configured to facilitate the use of a blockchain for distributed denial of service attack mitigation, the system can include a network security provider and a validating node. The network security provider can recognize that a distributed denial of service (DDoS) attack is occurring, create a block that includes data related to the DDoS attack, and publish the block that includes the data related to the DDoS attack for addition to a blockchain. The validating node can validate the block that includes the data related to the DDoS attack and the block that includes the data related to the DDoS attack can be added to the blockchain. The block that includes the data related to the DDoS attack can be analyzed to determine how to mitigate a similar DDoS attack.

18 Claims, 4 Drawing Sheets

(56) References Cited

U.S. PATENT DOCUMENTS

| | | | | |
|---|---|---|---|---|
| 2019/0109717 | A1* | 4/2019 | Reddy | H04L 9/0643 |
| 2019/0230114 | A1* | 7/2019 | Grebovich | H04L 9/0861 |
| 2019/0230129 | A1* | 7/2019 | Digiambattista | H04L 63/20 |
| 2019/0287199 | A1* | 9/2019 | Messerges | G06F 16/27 |
| 2019/0379699 | A1* | 12/2019 | Kalragadda | G06N 3/006 |
| 2020/0112572 | A1* | 4/2020 | Ajayi | H04L 63/1416 |
| 2020/0137090 | A1* | 4/2020 | Holzhauer | H04L 63/1416 |
| 2020/0213087 | A1* | 7/2020 | Mazzarella | H04L 9/3239 |
| 2020/0366495 | A1* | 11/2020 | Mahoney | H04L 9/12 |
| 2021/0211468 | A1* | 7/2021 | Griffin | H04L 9/0825 |

OTHER PUBLICATIONS

Yang, Xue; Liu, Bingyang; Yang, Fei; Wang, Chuang; "A Blockchain based Online Trading System for DDoS Mitigation Services", Intl Conf on ISPA/IUCC/BDCloud/SocialCom/SustainCom, IEEE, Dec. 11-13, 2018, pp. 1036-1037.*

International Search Report and Written Opinion in International Patent Application No. PCT/US2019/067051 dated Apr. 14, 2020, 9 pages.

Rodrigues et al., "A Blockchain-Based Architecture for Collaborative DDoS Mitigation with Smart Contracts", IFIP International Conference on Autonomous Infrastructure, Management and Security, pp. 16-29, Jun. 17, 2017.

* cited by examiner

USING A BLOCKCHAIN FOR DISTRIBUTED DENIAL OF SERVICE ATTACK MITIGATION

TECHNICAL FIELD

This disclosure relates in general to the field of information security, and more particularly, to the use of a blockchain for distributed denial of service attack mitigation.

BACKGROUND

The field of network security has become increasingly important in today's society. The Internet has enabled interconnection of different computer networks all over the world. In particular, the Internet provides a medium for exchanging data between different users connected to different computer networks via various types of client devices. While the use of the Internet has transformed business and personal communications, it has also been used as a vehicle for malicious operators.

One type of technique used by malicious operators to extort money and/or generally create problems is a denial-of-service (DOS) attack or distributed denial of service (DDoS) attack. A DOS attack is a cyber-attack where the malicious operator seeks to make a machine or network resource unavailable to its intended users by temporarily or indefinitely disrupting services of a host connected to the Internet. Denial of service is typically accomplished by flooding the targeted machine or resource with superfluous requests in an attempt to overload systems and prevent some or all legitimate requests from being fulfilled. A DDoS attack is a type of DOS attack where the malicious operator floods a target with traffic that originates from many different sources. This effectively makes it impossible to stop the attack simply by blocking a single source. There are many different types of DDoS attacks and significant administrative challenges remain for protecting computers and computer networks from DDoS attacks.

BRIEF DESCRIPTION OF THE DRAWINGS

To provide a more complete understanding of the present disclosure and features and advantages thereof, reference is made to the following description, taken in conjunction with the accompanying figures, wherein like reference numerals represent like parts, in which.

The FIGURES of the drawings are not necessarily drawn to scale, as their dimensions can be varied considerably without departing from the scope of the present disclosure.

DETAILED DESCRIPTION OF EMBODIMENTS

The following detailed description sets forth examples of apparatuses, methods, and systems relating to a system to help facilitate a blockchain for distributed denial of service attack mitigation in accordance with an embodiment of the present disclosure. Features such as structure(s), function(s), and/or characteristic(s), for example, are described with reference to one embodiment as a matter of convenience; various embodiments may be implemented with any suitable one or more of the described features.

In the following description, various aspects of the illustrative implementations will be described using terms commonly employed by those skilled in the art to convey the substance of their work to others skilled in the art. However, it will be apparent to those skilled in the art that the embodiments disclosed herein may be practiced with only some of the described aspects. For purposes of explanation, specific numbers, materials, and configurations are set forth in order to provide a thorough understanding of the illustrative implementations. However, it will be apparent to one skilled in the art that the embodiments disclosed herein may be practiced without the specific details. In other instances, well-known features are omitted or simplified in order not to obscure the illustrative implementations.

In the following detailed description, reference is made to the accompanying drawings that form a part hereof wherein like numerals designate like parts throughout, and in which is shown, by way of illustration, embodiments that may be practiced. It is to be understood that other embodiments may be utilized and structural or logical changes may be made without departing from the scope of the present disclosure. Therefore, the following detailed description is not to be taken in a limiting sense. For the purposes of the present disclosure, the phrase "A and/or B" means (A), (B), or (A and B). For the purposes of the present disclosure, the phrase "A, B, and/or C" means (A), (B), (C), (A and B), (A and C), (B and C), or (A, B, and C).

Figure 1:
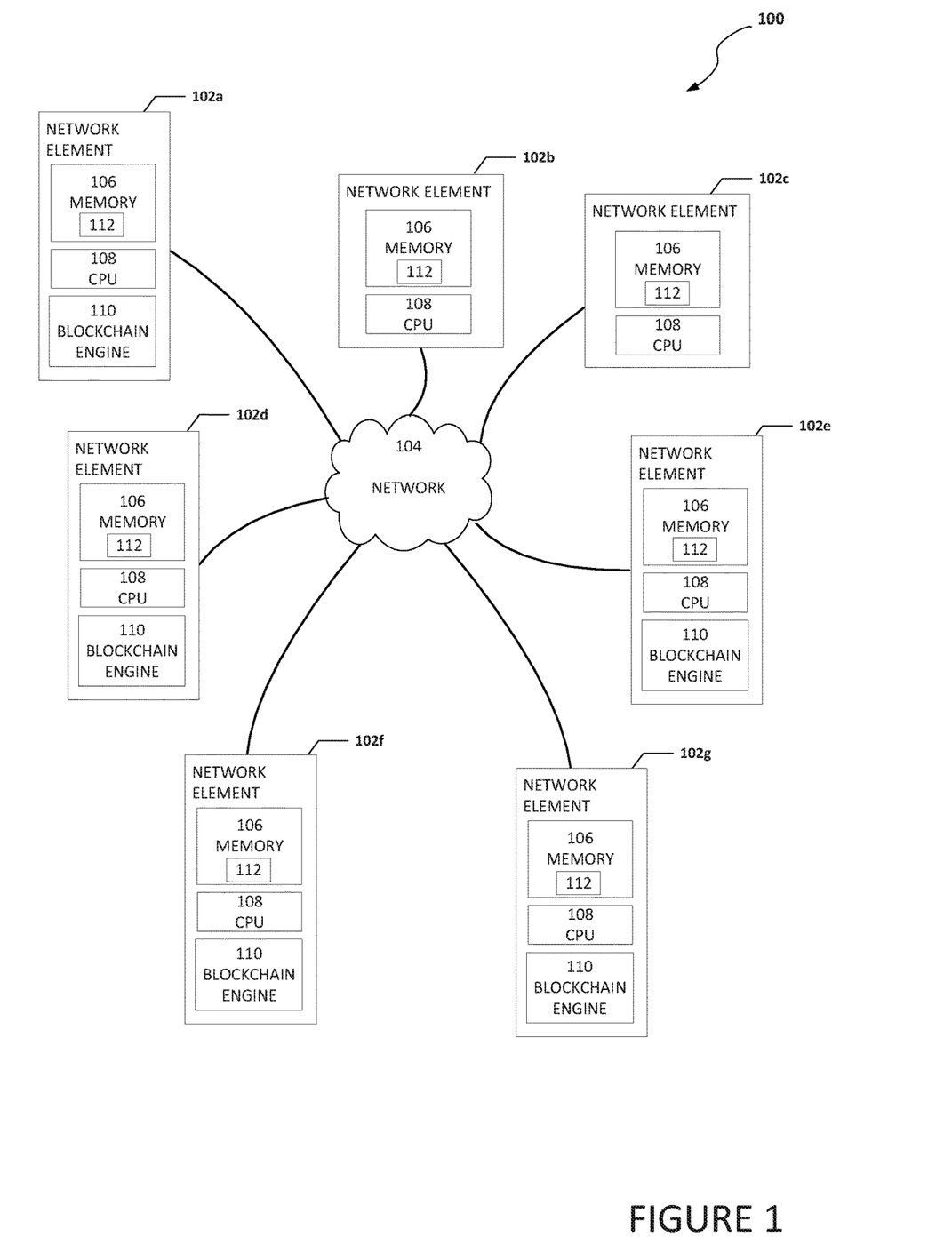
FIG. 1 is a simplified block diagram of a system to help facilitate a blockchain for distributed denial of service attack mitigation.

FIG. 1 is a simplified block diagram of a system 100 to help facilitate a blockchain for distributed denial of service attack mitigation in accordance with an embodiment of the present disclosure. As illustrated in FIG. 1, an embodiment of system 100 can include a plurality of network elements 102a-102g. Network elements 102a-102g can be in communication with each other using network 104. Each network element 102a-102g can include memory, a computer processing unit (CPU), and a blockchain engine. For example, as illustrated in FIG. 1, network element 102a includes memory 106, one or more CPUs 108, and blockchain engine 110. Memory 106 can include a blockchain 112.

Each network element 102a-102g may be a home network security provider, content provider, data center, part of an enterprise network, a DDoS mitigation provider, or a government entity, law enforcement entity, forensic analysis entity, or some other similar entity. In some examples, one or more of network elements 102a-102g may be a home network security provider and a validating node. If a network element (e.g., network element 102b or 102c) is a content provider, data center, part of an enterprise network, or government entity, law enforcement entity, forensic analysis entity, or some other similar entity, then the network element may not include a blockchain engine 110 and may not be configured to generate a block for blockchain 112 or validate a block for blockchain 112 and can only access and review data in blockchain 112.

Blockchain engine 110 can be configured to generate a block for a DDoS threat intelligence blockchain (e.g., blockchain 112). In addition, blockchain engine 110 can be configured to validate a block for the blockchain. In some examples, blockchain engine 110 can be configured to only generate a block for the blockchain, only validate a block for a blockchain, or both generate a block for a blockchain and validate a block for a blockchain. Blockchain 112 can be a blockchain that includes details regarding a DDoS attack.

System 100 can be configured to allow for the automation and sharing of DDoS threat information in a private and permissioned blockchain network. More specifically, system 100 can include a decentralized blockchain (e.g., blockchain 112) to share DDoS attack details with targeted networks, DDoS mitigation providers, security vendors, law enforcement agencies, etc. The DDoS attack details can include a type of DDoS attack, types of devices used to launch the DDoS attack, bandwidth utilized by the attack traffic, attack target details, and other details related to the DDoS attack. The DDoS attack details can provide insights to DDoS mitigation providers, security vendors, target networks, etc. for coordinated and effective DDoS mitigation. In addition, organizations participating in the DDoS threat intelligence blockchain can leverage the information in the blockchain for coordinated and effective DDoS attack mitigation. In an example, the blockchain (e.g., blockchain 112) will not have a long chain of blocks, but instead will have multiple chains where each chain is for a specific DDoS attack and each chain is terminated by a block indicating the time when the DDoS attack stopped.

Elements of FIG. 1 may be coupled to one another through one or more interfaces employing any suitable connections (wired or wireless), which provide viable pathways for network (e.g., network 104) communications. Additionally, any one or more of these elements of FIG. 1 may be combined or removed from the architecture based on particular configuration needs. System 100 may include a configuration capable of transmission control protocol/Internet protocol (TCP/IP) communications for the transmission or reception of packets in a network. System 100 may also operate in conjunction with a user datagram protocol/IP (UDP/IP) or any other suitable protocol where appropriate and based on particular needs.

For purposes of illustrating certain example techniques of system 100, it is important to understand the communications that may be traversing the network environment. The following foundational information may be viewed as a basis from which the present disclosure may be properly explained.

Malicious software ("malware") that infects a host computer may be able to perform any number of malicious actions, such as stealing sensitive information from a business or individual associated with the host computer, propagating to other host computers, assisting with distributed denial of service attacks, sending out spam or malicious emails from the host computer, etc. Hence, significant administrative challenges remain for protecting network elements, connected devices, etc. and computer networks from malicious and inadvertent exploitation by malicious software and devices. One way malicious operators can affect a system or target is to use a DDoS attack.

A DDoS attack is an attempt to make machines or network resources unavailable to their intended users. The victim in a DDoS attack or target of a DDoS attack can be an application server, a router, a firewall, or a network link of an entire network. In most cases, a DDoS attack is achieved by compromising a plurality of devices (e.g., end-hosts) and using those infected devices to perpetrate the DDoS attack. In one DDoS attack, sufficient attack scale was achieved by compromising enough IOT devices and using those IOT devices to perpetrate and amplify the DDoS attack traffic.

One of the key challenges in mitigating a DDoS attack is that the DDoS attack traffic comes in many forms. The DDoS attack traffic can vary in design from an un-spoofed single source DDoS attack to a complex and adaptive multi-vector DDoS attack. A multi-vector DDoS attack uses multiple attack pathways to overwhelm a target in different ways, potentially distracting mitigation efforts on any one trajectory. A DDoS attack that targets multiple layers of a protocol stack at the same time, such as a DNS amplification (targeting layers 3/4) coupled with a HTTP flood (targeting layer 7) is an example of multi-vector DDoS. Further, some DDoS attacks are used as smoke screen DDoS attacks to misdirect security systems from a real threat, such as data exfiltration. By distracting a security system with a DDoS attack, malicious operators are hoping they can slip past the security system by overloading the security system with activity in other parts of the network.

The mitigation technique used by DDoS mitigation providers is typically a hybrid solution integrating on-premise DDoS detection and mitigation along with a cloud-based DDoS scrubbing service. DDoS mitigation can be provided by on-premise security devices (e.g. Secure Home Platform (SHP), Network Security Platform (NSP), etc.), and by off-premise DDoS mitigation providers such as upstream transit providers offering DDoS mitigation service (e.g. Verizon, NTT, etc.), and cloud DDoS mitigation providers (e.g. Akamai, Radware, Arbor, etc.).

Today's standard defense techniques like SHP and NSP only provide point security solutions to detect and block outgoing DDoS attack traffic. While these security solutions block the outgoing DDoS attack traffic from their respective networks, they do not share the DDoS attack details to the target networks and to the DDoS mitigation providers protecting the target networks. Similarly, the DDoS mitigation providers do not share the DDoS attack details with security vendors offering point security solutions. As a result, there is very little collaboration or sharing of information regarding DDoS attacks. What is needed is a system and method to help the sharing of DDoS attack details with target networks, DDoS mitigation providers, security vendors, law enforcement agencies, etc.

A system and method that includes a decentralized blockchain to share DDoS attack details with target networks, DDoS mitigation providers, security vendors, law enforcement agencies, etc., as outlined in FIG. 1 can resolve these issues (and others). System 100 can be configured to include a blockchain based decentralized mechanism to share the DDoS attack details with the DDoS mitigation providers, target networks, and security vendors. DDoS mitigation providers can act as validating nodes. Law enforcement agencies can join the blockchain as non-validating nodes and use the DDoS details in the blockchain to try and identify malicious operators involved in DDoS attacks.

Security vendors can use the DDoS details in the blockchain to offer security solutions. Security vendors can also publish DDoS attack details in new blocks that can be added to the blockchain once the new blocks are published and validated. In some examples, security vendors can act as non-validating nodes and can only publish new blocks. In other examples, if the target network and DDoS mitigation providers are not part of the blockchain, the security vendors can also act as validating nodes.

Target networks can act as a validating node provided that the victim of the DDoS attack that published in the block is in the target network. More specifically, the target network can be a validating node if the target network can prove the ownership of the IP addresses and FQDN published in a new block. The ownership of the IP addresses and FQDN published in the new block can be verified using techniques such as or similar to domain name system security extensions (DNSSEC), resource public key infrastructure (RPKI), public key infrastructure (PKIX), etc.

Target networks can provide the configuration data of the DDoS mitigation providers protecting the target network in the first block of a blockchain, often referred to as a Genesis block. A target network may also publish data (e.g. target information) in the blockchain using a private configuration to keep some of the published DDoS attack details private. For example, private data in a block can be encrypted and only visible to the network elements or organizations authorized by the target network to view the private data. More specifically, if a hyperledger blockchain is used, the private data is only shared with authorized network elements or organizations using either hyperledger channels or private data collection.

A hyperledger channel is a private "subnet" of communication between two or more specific network members and is used for conducting private and confidential transactions. A channel is defined by network elements or organizations, anchor peers per network elements or organizations, a shared ledger, chaincode application(s), and/or service node(s). Each transaction regarding the blockchain on the network is executed on a channel, where each network element or organization must be authenticated and authorized to transact on that channel.

One option to keep data private is to create a new channel comprising just the network elements who need access to the data. However, creating separate channels can result in additional administrative overhead (maintaining chaincode versions, policies, MSPs, etc.), and doesn't allow for use cases where all channel participants can see a transaction while keeping a portion of the data private. Another option is to use what is known as private data collection. In a private data collection, the actual private data is only sent to the network elements authorized to see the private data. The data is stored in a private database on the network elements authorized to see the private data (sometimes called a side database, or SideDB). The network elements not authorized to see the private data are not involved and do not see the private data. A hash of the private data, is endorsed, ordered, and written to the ledgers of every network element on the channel. The hash serves as evidence of the transaction and is used for state validation and can be used for audit purposes.

When an outbound DDoS attack is detected by on-premise security devices (e.g., network element 102f) or an inbound DDoS attack is detected by a DDoS mitigation provider (e.g., network element 102e), a blockchain engine (e.g., blockchain engine 110) can publish the DDoS attack details in a new block to notify all the participants in the blockchain network about the DDoS attack and the details regarding the DDoS attack. The blockchain network is a network of interconnected devices (e.g., network elements 102a-102g) associated with the blockchain. The DDoS attack details can include the type of DDoS attack (e.g. DNS/NTP amplification, SYN flood, UDP flood, TCP food (e.g., bogus RST packets), IP fragmentation attack, Slowloris, TLS re-negotiation), the number of devices participating in the DDoS attack, the bandwidth utilized by the attack traffic, the target IP addresses and FQDN, etc. If the target network has opted for privacy, the target IP address and FQDN can be encrypted and only decrypted by organizations authorized by the target network. The DDoS attack details can also include attacker IP addresses. If the attacker is located behind NAT the attacker's public IP addresses can be discovered using protocols like STUN and PCP. In addition, the DDoS attack details can include the type of the device launching the DDoS attack, and if possible, its cryptographic capabilities and other details that can help with the analysis of the DDoS attack and mitigation of future attacks.

The DDoS attack details in the block can be used by a DDoS mitigation provider for capacity planning (e.g., to plan the mitigation resources required to block the attack traffic) and mitigation strategy. The DDoS attack details can also help the DDoS mitigation provider to identify the actual total volume of the attack traffic targeting the victim. The attack total volume is the actual attack traffic volume and is the sum of the attack traffic the mitigation provider is scrubbing plus the attack traffic blocked by on-premise security solutions (like SHP and NSP in various home and enterprise networks). The DDoS attack details can also help the DDoS mitigation provider identify the number of compromised devices participating in the coordinated DDoS attack. On-premise security solutions can relatively easily detect flood attacks but may fail to detect a transformed multi-vector DDoS attack that can flood a target with maliciously crafted requests. The DDoS attack details can help the DDoS mitigator to anticipate the mitigation resources required to handle multi-vector attacks. If the actual total attack traffic volume cannot be handled by the DDoS mitigator, the target or the DDoS mitigator can request assistance from another DDoS mitigation provider capable of handling the attack. Alternatively, if the content provider is leveraging the service of multiple DDoS mitigation providers, the target can select one of the DDoS mitigation providers based on the DDoS attack details. For example, the target may select a DDoS mitigation provider based the DDoS mitigator's capability to handle the total attack volume.

In an illustrative example, using the DDoS attack details conveyed by an on-premise security solution, the DDoS mitigator can also plan the appropriate mitigation actions based on the device types (e.g., IoT devices) used to launch the DDoS attack. The device type can carry additional information, for example, the device's cryptographic capabilities. Knowing the device type launching the DDoS attack can help the DDoS mitigator to tune a cryptographic challenge to block attack traffic from millions of infected devices (e.g., the DDoS mitigator sends requests to the requesting devices (client devices) to solve various types of cryptographic puzzles (e.g., a secure hash algorithm (SHA)) based on the device type launching the DDoS attack). For example, if IoT devices are being used in a DDoS attack, the IoT devices launching the attack may be able to compute a SHA-1 function but may not have the capability to compute SHA-2/SHA-3 functions. To try and thwart the DDoS attack, the DDoS mitigator can request devices to solve multiple or single hash puzzles using SHA-2/SHA-3 function families. The IoT device will fail to perform the SHA-2/SHA-3 function and the DDoS mitigator will block the traffic from such IoT devices, thus thwarting the DDoS attack.

Enterprise networks typically have a service agreement with an ISP to protect their network resources. To help protect the enterprise network's resources, ISPs offer, among other things, DDoS mitigation services that can inspect the incoming traffic to detect DDoS attacks. However, for cost reasons, some ISPs do not turn on DDoS detection for outgoing traffic by default. ISPs can use system 100 to learn the DDoS attack details originating from its subscriber home networks and the ISPs can use the DDoS attack details to selectively enable DDoS detection to monitor outgoing traffic from home networks participating in the DDoS attack. ISPs managing home networks can also determine the devices attached to each home network and based on the device types conveyed in DDoS attack details, selectively enable DDoS detection to monitor outgoing traffic from home networks which have similar types of devices.

DDoS mitigation providers and target networks can contribute to the block-chain by validating DDoS attack details and publishing the attacker IP addresses used to launch DDoS traffic at the target resources. This validation will assist the on-premise security solutions to determine their efficacy and reduce false positives. The published attacker IP addresses will also assist the on-premise security solutions to detect false negatives. For example, on-premise security solutions like SHP and NSP typically use rate-based technology and statistical analysis to detect and block DDoS attacks. These security solutions may fail to distinguish between a flash crowd (a large amount of legitimate traffic) and a real DDoS attack. The validation from DDoS mitigation providers and target networks will assist on-premise security solutions to detect false positives.

When a block in a blockchain is created, the new block can be marked as "PENDING" until validating nodes in the blockchain network validate the new block and the DDoS attack details included in the new block. The new block will remain in the "PENDING" state until validating nodes in the blockchain network come to an agreement about whether or not the new block can be validated. The agreement can be in the form of a consensus algorithm or by some other means. After the new block is validated, any node in the blockchain network that has additional information about the ongoing DDoS attack can create another new block and link the other new block to the previously validated block. The validating nodes (DDoS mitigation providers and target network) can verify the other new block by determining if the other new block includes details similar to the details in validated blocks, details related to the type of DDoS attack traffic destined to the target network, and/or details related to a similar type of DDoS attack traffic destined to the target network. If the other new block includes details similar to the details in validated blocks, details related to the type of DDoS attack traffic destined to the target network, and/or details related to a similar type of DDoS attack traffic destined to the target network, then the other new block will be validated and added to the blockchain. If DDoS mitigation providers and/or the target network reject a block, the DDoS mitigation providers and/or target network can provide feedback to the on-premise security solutions to detect false positives. The attacker IP addresses published by the DDoS mitigation provider in the block can be used by on-premise security solutions to detect false negatives (e.g., a flash crowd).

If a target network does not join the blockchain, then only the DDoS mitigation provider protecting the target network will validate and commit the block. The DDoS mitigation provider can prove that it is protecting the target network using the private keys provided by the target network (the private keys are used by the DDoS mitigation provider to act as a TLS proxy to block Layer 7 attacks). If the DDoS mitigation providers in the blockchain network do not protect the target network and the target network is also not part of the block chain, then a consensus algorithm can be used to validate the block. For example, a practical Byzantine Fault Tolerance (PBFT) consensus algorithm can be used by the security vendors to validate the block.

Byzantine fault tolerance (BFT) is the dependability of a fault-tolerant computer system, particularly distributed computing systems, where components may fail or be corrupted and there is imperfect information on whether a component has failed or is corrupted. In a "Byzantine failure", a component can inconsistently appear both failed or corrupted and functioning, presenting different symptoms to different observers. A PBFT consensus algorithm is designed to deal with a byzantine failure situation where one or more of the members has failed, is corrupted, or is a traitor. Blockchains are decentralized ledgers which, by definition, are not controlled by a central authority. Due to the data stored in the DDoS blockchain, malicious operators have economic incentive to try and cause faults. A PBFT consensus algorithm can addressed the issue so long as the number of corrupted devices or traitors do not exceed one third of the members.

In an example, the DDoS threat intelligence blockchain will not have a long chain of blocks and will have multiple chains. Each chain will be terminated by a block indicating the time when the DDoS attack to the target has stopped. Currently, none of the existing DDoS mitigation solutions share the DDoS threat information with the target (or victim) network or the DDoS mitigation provider protecting the target or with the security devices in networks from which compromised devices are launching the DDoS attack. Blockchain based security solution providers like Polyswarm use remediation techniques where they share antivirus signatures but do not deal with DDoS attacks and the Polyswarm blockchain network does not involve semi-trusted parties. System 100 can provide a way of sharing and leveraging the DDoS threat information for coordinated and effective DDoS mitigation and a way to commit blocks in the blockchain. The blockchain helps to ensure that the DDoS attack details published by one organization is not corrupted or overridden by other organizations since a blockchain is inherently tamper proof. Also, target networks and DDoS mitigation providers participate in the blockchain as validating nodes would have a vested interest not to act as bad nodes, otherwise the attack will not be effectively mitigated and will adversely impact the business of the target network and the SLAs of the mitigation provider with the target network. The DDoS attack details can be signed using the target network's private key to provide data origin authentication. Outliers can be penalized by revoking the authorization to participate in the blockchain. In a centralized system, the organization managing the centralized system would have a monopoly to share the DDoS attack details, whereas in system 100, all the organizations participating in the permissioned blockchain network are stakeholders. In addition, if a consensus algorithm is used to validate the block in the blockchain, the consensus algorithm can help to avoid an individual organization's monopoly or collusion between organizations. In a centralized system, there is possibility of censoring and selective sharing of the DDoS attack details. System 100 can help to ensure that DDoS attack details are shared and available to everyone participating in the blockchain. A centralized system can delay the availability of the DDoS attack details to certain parties and provide undue advantage to selective organizations in the system. However, with a decentralized approach of the blockchain, system 100 can help ensure the published DDoS attack details is available to all participants in the blockchain network.

Turning to the infrastructure of FIG. 1, system 100 in accordance with an example embodiment is shown. Generally, system 100 can be implemented in any type or topology of networks. Network 104 represents a series of points or nodes of interconnected communication paths for receiving and transmitting packets of information that propagate through system 100. Network 104 offers a communicative interface between nodes, and may be configured as any local area network (LAN), virtual local area network (VLAN), wide area network (WAN), wireless local area network (WLAN), metropolitan area network (MAN), Intranet, Extranet, virtual private network (VPN), and any other appropriate architecture or system that facilitates communications in a network environment, or any suitable combination thereof, including wired and/or wireless communication.

In system 100, network traffic, which is inclusive of packets, frames, signals, data, etc., can be sent and received according to any suitable communication messaging protocols. Suitable communication messaging protocols can include a multi-layered scheme such as Open Systems Interconnection (OSI) model, or any derivations or variants thereof (e.g., Transmission Control Protocol/Internet Protocol (TCP/IP), user datagram protocol/IP (UDP/IP)). Additionally, radio signal communications over a cellular network may also be provided in system 100. Suitable interfaces and infrastructure may be provided to enable communication with the cellular network.

The term "packet" as used herein, refers to a unit of data that can be routed between a source node and a destination node on a packet switched network. A packet includes a source network address and a destination network address. These network addresses can be Internet Protocol (IP) addresses in a TCP/IP messaging protocol. The term "data" as used herein, refers to any type of binary, numeric, voice, video, textual, or script data, or any type of source or object code, or any other suitable information in any appropriate format that may be communicated from one point to another in electronic devices and/or networks. Additionally, messages, requests, responses, and queries are forms of network traffic, and therefore, may comprise packets, frames, signals, data, etc.

Network elements 102*a*-102*g* can each be a desktop computer, laptop computer, mobile device, personal digital assistant, smartphone, tablet, network appliances, servers, routers, switches, gateways, bridges, load balancers, or any other suitable device, component, element, or object operable to exchange information in a network environment. A server can be a virtual server and can be associated with clients, customers, endpoints, or end users wishing to initiate a communication in system 100 via some network (e.g., network 104). The term 'server' is inclusive of devices used to serve the requests of clients and/or perform some computational task on behalf of clients within system 100. Network elements 102*a*-102*g* may include any suitable hardware, software, components, modules, or objects that facilitate the operations thereof, as well as suitable interfaces for receiving, transmitting, and/or otherwise communicating data or information in a network environment. This may be inclusive of appropriate algorithms and communication protocols that allow for the effective exchange of data or information.

In regards to the internal structure associated with system 100, each of network elements 102*a*-102*g* can include memory elements (e.g., memory 106) for storing information to be used in the operations outlined herein. Each of network elements 102*a*-102*g* may keep information in any suitable memory element (e.g., disk, random access memory (RAM), read-only memory (ROM), erasable programmable ROM (EPROM), electrically erasable programmable ROM (EEPROM), application specific integrated circuit (ASIC), etc.), software, hardware, firmware, or in any other suitable component, device, element, or object where appropriate and based on particular needs. Any of the memory items discussed herein should be construed as being encompassed within the broad term 'memory element.' Moreover, the information being used, tracked, sent, or received in system 100 could be provided in any database, register, queue, table, cache, control list, or other storage structure, all of which can be referenced at any suitable timeframe. Any such storage options may also be included within the broad term 'memory element' as used herein.

In certain example implementations, the functions outlined herein may be implemented by logic encoded in one or more tangible media (e.g., embedded logic provided in an ASIC, digital signal processor (DSP) instructions, software (potentially inclusive of object code and source code) to be executed by a processor, or other similar machine, etc.), which may be inclusive of non-transitory computer-readable media. In some of these instances, memory elements can store data used for the operations described herein. This includes the memory elements being able to store software, logic, code, or processor instructions that are executed to carry out the activities described herein.

In an example implementation, network elements of system 100, such as network elements 102*a*-102*g* may include software modules (e.g., blockchain engine 110) to achieve, or to foster, operations as outlined herein. These modules may be suitably combined in any appropriate manner, which may be based on particular configuration and/or provisioning needs. In example embodiments, such operations may be carried out by hardware, implemented externally to these elements, or included in some other network device to achieve the intended functionality. Furthermore, the modules can be implemented as software, hardware, firmware, or any suitable combination thereof. These elements may also include software (or reciprocating software) that can coordinate with other network elements in order to achieve the operations, as outlined herein.

Additionally, each of network elements 102*a*-102*g* may include a processor (e.g., CPU 108) that can execute software or an algorithm to perform activities as discussed herein. A processor can execute any type of instructions associated with the data to achieve the operations detailed herein. In one example, the processors could transform an element or an article (e.g., data) from one state or thing to another state or thing. In another example, the activities outlined herein may be implemented with fixed logic or programmable logic (e.g., software/computer instructions executed by a processor) and the elements identified herein could be some type of a programmable processor, programmable digital logic (e.g., a field programmable gate array (FPGA), an EPROM, an EEPROM) or an ASIC that includes digital logic, software, code, electronic instructions, or any suitable combination thereof. Any of the potential processing elements, modules, and machines described herein should be construed as being encompassed within the broad term 'processor.'

Figure 2:
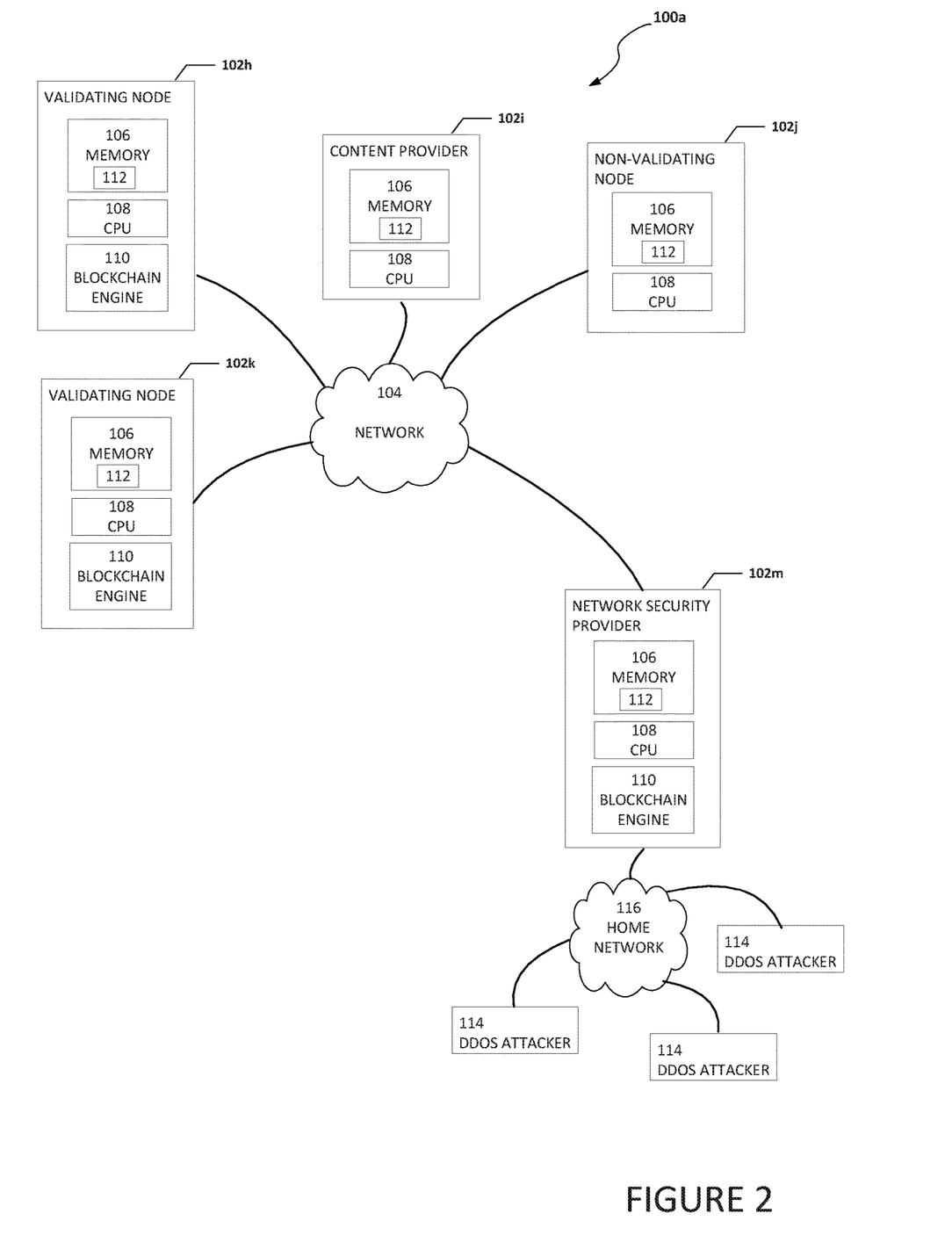
FIG. 2 is a simplified block diagram of a portion of a system to help facilitate a blockchain for distributed denial of service attack mitigation in accordance with an embodiment of the present disclosure.

Turning to FIG. 2, FIG. 2 is a simplified block diagram of a system 100*a* to help facilitate a blockchain for distributed denial of service attack mitigation in accordance with an embodiment of the present disclosure. In an example, system 100*a* can include a plurality of network elements 102*h*-102*m*. Network elements 102*h*-102*m* can be in communication with each other using network 104.

Each network element 102*h*-102*m* can include memory, a computer processing unit (CPU), and a blockchain engine.

For example, as illustrated in FIG. 2, network element 102*h* includes memory 106, one or more CPUs 108, and blockchain engine 110. Memory 106 can include blockchain 112.

In an example, network elements 102*h* and 102*k* may be a validating node, network element 102*i* may be a content provider, data center, part of an enterprise network, etc., network element 102*j* may be a non-validating node, and network elements 102*l* and 102*m* may be network security providers. Network elements 102*h* and 102*k* may be a DDoS mitigation provider. A DDoS mitigation provider is a specialized service and/or device or group of devices that can provide DDoS mitigation. Network element 102*j* may be part of a government entity, law enforcement entity, forensic analysis entity, or some other similar entity. Network elements 102*l* and 102*m* can generate blocks for a blockchain. In some examples, network elements 102*i*, 102*l* and/or 102*m* may also be a validating node that can validate a block to be added to a blockchain.

In an illustrative example, one or more DDoS attackers 114 attached to a home network 116 begin a DDoS attack on a target (e.g., network element 102*i* configured as a content provider). DDoS attackers 114 can be a bot, botnet, or otherwise part of a group of hijacked Internet-connected devices that can be used in a DDoS attack. Home network 116 represents a series of points or nodes of interconnected communication paths for receiving and transmitting packets of information. Home network 116 offers a communicative interface and may be configured as any LAN, VLAN, WLAN, and any other appropriate architecture or system that facilitates communications in a local network environment, or any suitable combination thereof, including wired and/or wireless communication.

Network element 102*m*, acting as a security provider, can detect the DDoS traffic and attempt to block the DDoS attack. In addition, using blockchain engine 110, network element 102*m* can create a block that includes details regarding the DDoS attack and publish the block for addition of the block to blockchain 112. Validating nodes (e.g., network elements 102*h* and 102*k*) can be notified about the new block and one or more of the validating nodes can validate the block for addition to the blockchain. In an example, a block is validated when the validating node or nodes (e.g., DDoS mitigation provider or service provider) observe DDoS attack traffic destined to the target network that is similar to the information present in the block After the block has been validated and added to the block chain, network elements can analyze the data in the block chain to help study and mitigate DDoS attacks. If network element 102*j* is a government entity, law enforcement entity, forensic analysis entity, or some other similar entity, network element 102*j* can use the data in the blockchain to help track and identify malicious operators. The blockchain helps to ensure that the DDoS attack details published by one organization is not corrupted or overridden by other organizations since the blockchain is inherently tamper proof.

Figure 3:
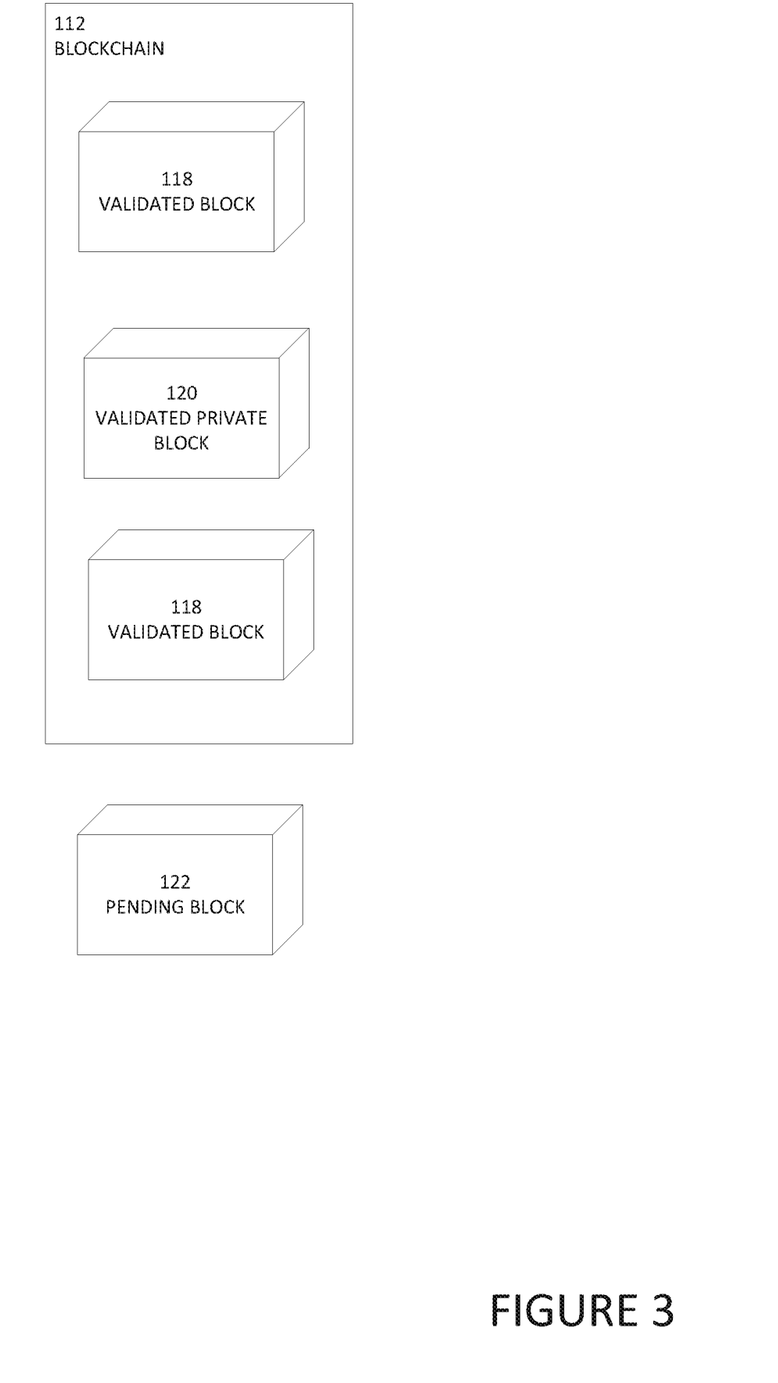
FIG. 3 is a simplified block diagram of a portion of a system to help facilitate a blockchain for distributed denial of service attack mitigation in accordance with an embodiment of the present disclosure.

Turning to FIG. 3, FIG. 3 is an example blockchain 112 in accordance with an embodiment of the present disclosure. Blockchain 112 can include one or more validated bocks 118. In addition, blockchain 112 can include one or more validated private blocks 120. In an example, blockchain 112 can include any combination of one or more validated blocks 118 and/or one or more validated private blocks 120.

One or more validated private blocks 120 may be used in a hyperledger blockchain where the private data in validated private block is only shared with authorized network elements and/or users. Pending block 122 can be a published block that includes details regarding a DDoS attack. Once pending block 122 is validated, then pending block can be added to blockchain 112 and will become a validated block 118 or a validated private block 120. The data in each validated block 118 and/or each validated private block 120 can provide valuable insights to DDoS mitigation providers, security vendors, target networks, etc. for coordinated and effective DDoS mitigation.

Figure 4:
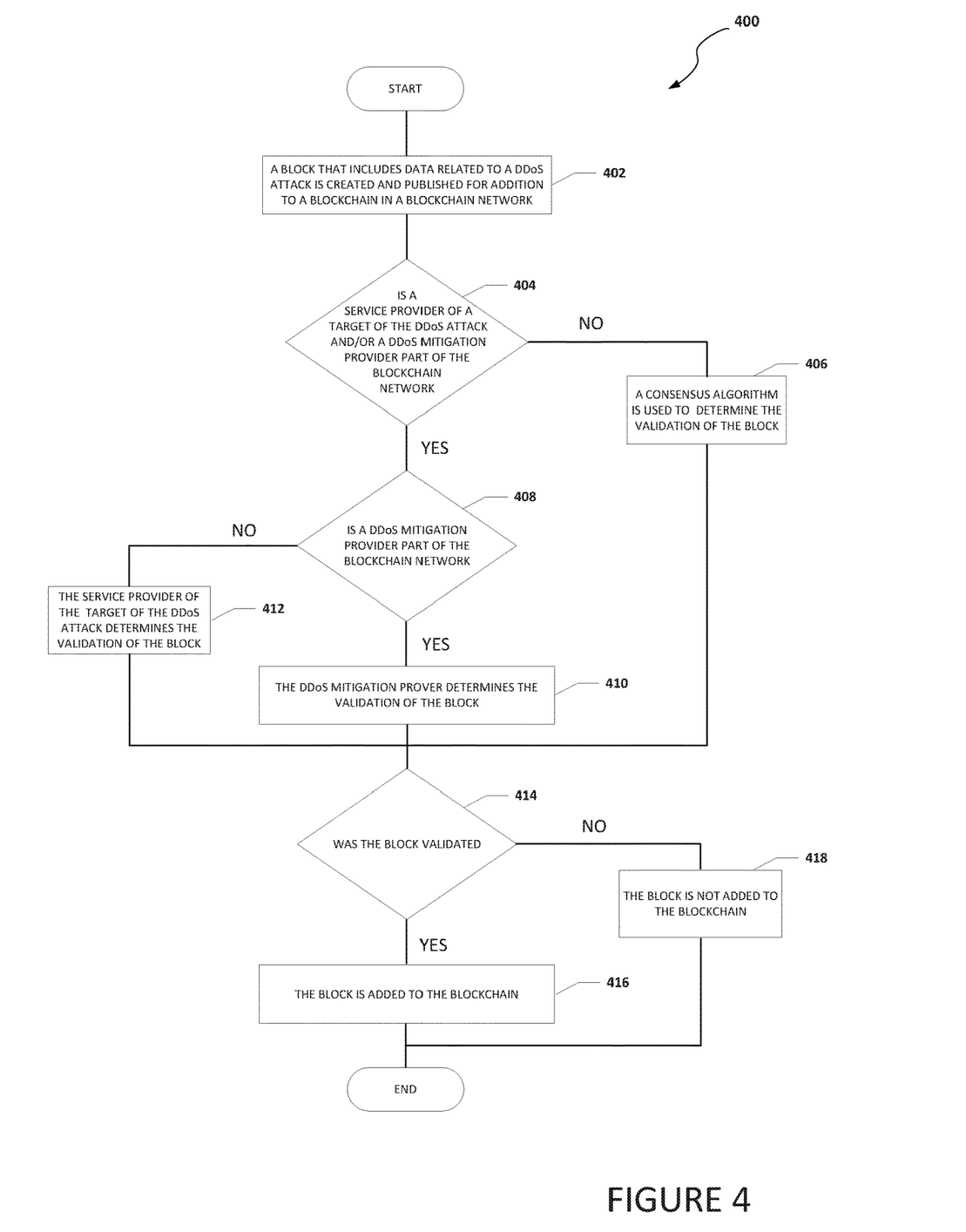
FIG. 4 is a simplified flowchart illustrating potential operations that may be associated with the communication system in accordance with an embodiment.

Turning to FIG. 4, FIG. 4 is an example flowchart illustrating possible operations of a flow 400 that may be associated with a blockchain for distributed denial of service attack mitigation, in accordance with an embodiment. In an embodiment, one or more operations of flow 400 may be performed by blockchain engine 144. At 402, a block that includes data related to a DDoS attack is created and published for addition to a blockchain in a blockchain network. For example, when an outbound DDoS attack is detected by on-premise security devices, a network security provider can create the block that includes data related to the DDoS attack. Also, if an inbound DDoS attack is detected by a DDoS mitigation provider, the DDoS mitigation provider can create the block that includes data related to the DDoS attack. At 404, the system determines if a service provider of a target of the DDoS attack and/or a DDoS mitigation provider is part of the blockchain network. If the system determines a service provider of a target of the DDoS attack and/or a DDoS mitigation provider is part of the blockchain network, then the system determines if a DDoS mitigation provider is part of the blockchain network, as in 408. If a DDoS mitigation provider is part of the blockchain network, then the DDoS mitigation provider that is part of the blockchain network determines the validation of the block, as in 410. If a DDoS mitigation provider is not part of the blockchain network, then the service provider of the target of the DDoS attack determines the validation of the block, as in 412. Going back to 404, if the system determines a service provider of a target of the DDoS attack and/or a DDoS mitigation provider are not part of the blockchain network, then a consensus algorithm is used to determine the validation of the block, as in 406. For example, a PBFT consensus algorithm can be used to determine validation of the block. At 414, the system determines if the block was validated. If the block was validated, then the block is added to the blockchain, as in 416. If the block was not validated, then the block is not added to the blockchain, as in 418. Once the block is added to the blockchain, network elements that belong to the blockchain network can analyze the block to determine how to mitigate a similar DDoS attack.

Note that with the examples provided herein, interaction may be described in terms of two, three, or more network elements. However, this has been done for purposes of clarity and example only. In certain cases, it may be easier to describe one or more of the functionalities of a given set of flows by only referencing a limited number of network elements. It should be appreciated that system 100 and its teachings are readily scalable and can accommodate a large number of components, as well as more complicated/sophisticated arrangements and configurations. Accordingly, the examples provided should not limit the scope or inhibit the broad teachings of system 100 as potentially applied to a myriad of other architectures.

It is also important to note that the operations in the preceding flow diagram (i.e., FIG. 4) illustrate only some of the possible correlating scenarios and patterns that may be executed by, or within, system 100. Some of these operations may be deleted or removed where appropriate, or these operations may be modified or changed considerably without departing from the scope of the present disclosure. In addition, a number of these operations have been described as being executed concurrently with, or in parallel to, one or more additional operations. However, the timing of these operations may be altered considerably. The preceding operational flows have been offered for purposes of example and discussion. Substantial flexibility is provided by system 100 in that any suitable arrangements, chronologies, configurations, and timing mechanisms may be provided without departing from the teachings of the present disclosure.

Although the present disclosure has been described in detail with reference to particular arrangements and configurations, these example configurations and arrangements may be changed significantly without departing from the scope of the present disclosure. Moreover, certain components may be combined, separated, eliminated, or added based on particular needs and implementations. Additionally, although system 100 has been illustrated with reference to particular elements and operations that facilitate the communication process, these elements and operations may be replaced by any suitable architecture, protocols, and/or processes that achieve the intended functionality of system 100

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 as it exists on the date of the filing hereof unless the words "means for" or "step for" are specifically used in the particular claims; and (b) does not intend, by any statement in the specification, to limit this disclosure in any way that is not otherwise reflected in the appended claims.

OTHER NOTES AND EXAMPLES

In Example M1, a method can include recognizing that a distributed denial of service (DDoS) attack is occurring, creating a block for a blockchain, wherein the block includes data related to the DDoS attack, validating the block that includes the data related to the DDoS attack, and adding the block that includes the data related to the DDoS attack to the blockchain.

In Example, M2, the subject matter of Example M1 can optionally include analyzing the block that includes the data related to the DDoS attack to determine how to mitigate a similar DDoS attack.

In Example M3, the subject matter of any one of Examples M1-M2 can optionally include where at least a portion of the data related to the DDoS attack in the block is private data.

In Example M4, the subject matter of any one of Examples M1-M3 can optionally include where a service provider of a network element that was a target of the DDoS attack validates the block that includes the data related to the DDoS attack.

In Example M5, the subject matter of any one of Examples M1-M4 can optionally include where a DDoS mitigation provider validates the block that includes the data related to the DDoS attack.

In Example M6, the subject matter of any one of Examples M1-M5 can optionally include where a consensus algorithm is used to validate the block that includes the data related to the DDoS attack.

In Example M7, the subject matter of any one of Examples M1-M6 can optionally include where the block that includes the data related to the DDoS attack is analyzed by a government entity, law enforcement entity, or forensic analysis entity after the block was added to the blockchain.

Example S1 is a system to facilitate a use of a blockchain for distributed denial of service (DDoS) attack mitigation. The system can include a network security provider where the network security provider is configured to recognize that a DDoS attack is occurring, create a block for the blockchain, wherein the block includes data related to the DDoS attack, and publish the block that includes the data related to the DDoS attack for addition to the blockchain. The system can also include a validating node, where the validating node is configured to validate the block that includes the data related to the DDoS attack and the block that includes the data related to the DDoS attack is added to the blockchain.

In Example S2, the subject matter of Example S1 can optionally include where the block that includes the data related to the DDoS attack is analyzed to determine how to mitigate a similar DDoS attack.

In Example S3, the subject matter of any of the Examples S1-52 can optionally include where at least a portion of the data related to the DDoS attack in the block is private data.

In Example S4, the subject matter of any of the Examples S1-53 can optionally include where the validating node is a service provider that was a target of the DDoS attack and the service provider validates the block that includes the data related to the DDoS attack.

In Example S5, the subject matter of any of the Examples S1-54 can optionally include where the validating node is a DDoS mitigation provider and the DDoS mitigation provider validates the block that includes the data related to the DDoS attack.

In Example S6, the subject matter of any of the Examples S1-55 can optionally include where the validating node is a DDoS mitigation provider and the DDoS mitigation provider validates the block that includes the data related to the DDoS attack.

In Example S7, the subject matter of any of the Examples S1-56 can optionally include where the block that includes the data related to the DDoS attack is analyzed by a government entity, law enforcement entity, or forensic analysis entity after the block was added to the blockchain.

Example C1 is at least one machine readable medium having one or more instructions that when executed by at least one processor cause the at least one processor to recognize that a distributed denial of service (DDoS) attack is occurring, create a block for a blockchain, wherein the block includes data related to the DDoS attack, validate the block that includes the data related to the DDoS attack, and add the block that includes the data related to the DDoS attack to the blockchain.

In Example C2, the subject matter of Example C1 can optionally include one or more instructions that when executed by the least one processor, causes the least one processor to analyze the block that includes the data related to the DDoS attack to determine how to mitigate a similar DDoS attack.

In Example C3, the subject matter of any one of Examples C1-C2 can optionally include where t least a portion of the data related to the DDoS attack in the block is private data.

In Example C4, the subject matter of any one of Examples C1-C3 can optionally where a service provider of a network element that was a target of the DDoS attack validates the block that includes the data related to the DDoS attack.

In Example C5, the subject matter of any one of Examples C1-C4 can optionally include where a DDoS mitigation provider validates the block that includes the data related to the DDoS attack.

In Example C6, the subject matter of any one of Examples C1-05 can optionally include where a consensus algorithm is used to validate the block that includes the data related to the DDoS attack.

In Example C7, the subject matter of any one of Example C1-C6 can optionally include where the block that includes the data related to the DDoS attack is analyzed by a government entity, law enforcement entity, or forensic analysis entity after the block was added to the blockchain.

Example SS1 is a system to facilitate a use of a blockchain for distributed denial of service (DDoS) attack mitigation, the system including means for recognizing that a distributed denial of service (DDoS) attack is occurring, means for creating a block for a blockchain, wherein the block includes data related to the DDoS attack, means for validating the block that includes the data related to the DDoS attack, and means for adding the block that includes the data related to the DDoS attack to the blockchain.

In Example SS2, the subject matter of Example SS1 can optionally include means for analyzing the block that includes the data related to the DDoS attack to determine how to mitigate a similar DDoS attack.

In Example SS3, the subject matter of any of the Examples SS1-SS2 can optionally include where at least a portion of the data related to the DDoS attack in the block is private data.

In Example SS4, the subject matter of any of the Examples SS1-SS3 can optionally include where a service provider of a network element that was a target of the DDoS attack validates the block that includes the data related to the DDoS attack.

In Example SS5, the subject matter of any of the Examples SS1-SS4 can optionally include where a DDoS mitigation provider validates the block that includes the data related to the DDoS attack.

In Example SS6, the subject matter of any of the Examples SS1-SS5 can optionally include where a consensus algorithm is used to validate the block that includes the data related to the DDoS attack.

In Example SS7, the subject matter of any of the Examples SS1-SS6 can optionally include where the block that includes the data related to the DDoS attack is analyzed by a government entity, law enforcement entity, or forensic analysis entity after the block was added to the blockchain.

Example X1 is a machine-readable storage medium including machine-readable instructions to implement a method or realize an apparatus as in any one of the Examples M1-M7, A1-A8, or SS1-SS7. Example Y1 is an apparatus comprising means for performing of any of the Example methods M1-M7. In Example Y2, the subject matter of Example Y1 can optionally include the means for performing the method comprising a processor and a memory. In Example Y3, the subject matter of Example Y2 can optionally include the memory comprising machine-readable instructions.

What is claimed is:

1. A method comprising:
   at least partially recognizing, by a security provider, that a distributed denial of service (DDoS) attack is occurring on a target network;
   determining if a blockchain related to the DDoS attack exists;
   if the blockchain related to the DDoS attack does not exist, creating the blockchain related to the DDoS attack;
   creating, by the security provider that at least partially recognizing the DDoS attack, a block for the blockchain related to the DDoS attack, wherein the block includes data related to the DDoS attack;
   validating the block that includes the data related to the DDoS attack, wherein the block is validated by:
     the target network if the security provider that created the block is in the target network and the target network is part of the blockchain; or
     at least one DDoS mitigation provider if the DDoS mitigation provider can verify that it is protecting the target network by using private keys provided by the target network; and
   adding the block that includes the data related to the DDoS attack to the blockchain related to the DDoS attack.

2. The method of claim 1, further comprising:
   analyzing the blockchain related to the DDoS attack to determine how to mitigate a similar DDoS attack.

3. The method of claim 1, wherein a consensus algorithm is used to validate the block that includes the data related to the DDoS attack.

4. The method of claim 1, wherein the block that includes the data related to the DDoS attack is analyzed by a government entity, law enforcement entity, or forensic analysis entity after the block was added to the blockchain.

5. The method of claim 1, wherein the blockchain related to the DDoS attack is terminated by a block indicating a time when the DDoS attack stopped.

6. The method of claim 1, wherein the target network can be a validating node if the target network can prove ownership of an Internet Protocol (IP) addresses and fully qualified domain name (FQDN) published in the block.

7. The method of claim 1, wherein the target network can publish data in the block using a private configuration or a hyperledger blockchain.

8. The method of claim 1, wherein the security provider is located on a device subject to the DDoS attack and contributes data to the blockchain but does not validate any blocks in the blockchain while the DDoS mitigation provider does not contribute data to the blockchain but does validate blocks in the blockchain.

9. The method of claim 1, if the target network and DDoS mitigation providers are not part of the blockchain, two or more security providers can validate the block by using a consensus algorithm.

10. A system to facilitate a use of a blockchain for distributed denial of service (DDoS) attack mitigation, the system comprising:
    a network security provider, wherein the network security provider is configured to:
      recognize that a DDoS attack is occurring on a target network;
      determining if a blockchain specific to the DDoS attack exists;
      if a blockchain specific to the DDoS attack does not exist, then a blockchain specific to the DDoS attack is created;

create a block for the blockchain that is specific to the DDoS attack, wherein the block includes data related to the DDoS attack; and publish the block that includes the data related to the DDoS attack for addition to the blockchain; and a validating node, wherein the validating node is the target network if the network security provider that created the block is in the target network and the target network is part of the blockchain or is at least one DDoS mitigation provider if the DDoS mitigation provider can verify that it is protecting the target network by using private keys provided by the target network, wherein the validating node is configured to:

validate the block that includes the data related to the DDoS attack; and add the block that includes the data related to the DDoS attack to the blockchain that is specific to the DDoS attack.

11. The system of claim 10, wherein the block that includes the data related to the DDoS attack is analyzed to determine how to mitigate a similar DDoS attack.

12. The system of claim 10, wherein the validating node is a service provider that was a target of the DDoS attack and the service provider validates the block that includes the data related to the DDoS attack.

13. The system of claim 10, wherein the block that includes the data related to the DDoS attack is analyzed by a government entity, law enforcement entity, or forensic analysis entity after the block was added to the blockchain.

14. At least one non-transitory machine-readable medium comprising one or more instructions that when executed by at least one processor, cause the at least one processor to:

recognize, by a security provider, that a distributed denial of service (DDoS) attack is occurring on a target network;

determine if a blockchain specific to the DDoS attack exists;

if a blockchain specific to the DDoS attack does not exist, then a blockchain specific to the DDoS attack is created;

create, by the security provider that recognized the DDoS attack, a block for the blockchain that is specific to the DDoS attack, wherein the block includes data related to the DDoS attack;

validate the block that includes the data related to the DDoS attack, wherein the block is validated by:

the target network if the security provider that created the block is in the target network and the target network is part of the blockchain; or at least one DDoS mitigation provider if the DDoS mitigation provider can verify that it is protecting the target network by using private keys provided by the target network; and add the block that includes the data related to the DDoS attack to the blockchain that is specific to the DDoS attack.

15. The at least one machine-readable medium of claim 14, further comprising one or more instructions that when executed by the at least one processor, further cause the processor to:

analyze the block that includes the data related to the DDoS attack to determine how to mitigate a similar DDoS attack.

16. The at least one machine-readable medium of claim 14, wherein at least a portion of the data related to the DDoS attack in the block is private data.

17. The at least one machine-readable medium of claim 14, wherein a consensus algorithm is used to validate the block that includes the data related to the DDoS attack.

18. The at least one machine-readable medium of claim 14, wherein the block that includes the data related to the DDoS attack is analyzed by a government entity, law enforcement entity, or forensic analysis entity after the block was added to the blockchain.

* * * * *